United States Patent
Koivukunnas

[11] Patent Number: 6,158,501
[45] Date of Patent: *Dec. 12, 2000

[54] THERMALLY INSULATED ROLL AND INSULATION ASSEMBLY FOR A THERMOROLL

[75] Inventor: Pekka Koivukunnas, Järvenpää, Finland

[73] Assignee: Valmet Corporation, Helsinki, Finland

[*] Notice: Under 35 U.S.C. 154(b), the term of this patent shall be extended for 519 days.

[21] Appl. No.: 08/785,099

[22] Filed: Jan. 21, 1997

Related U.S. Application Data

[63] Continuation-in-part of application No. 08/326,476, Oct. 20, 1994, abandoned, and a continuation-in-part of application No. 08/326,545, Oct. 20, 1994, abandoned.

[30] Foreign Application Priority Data

Oct. 20, 1993 [FI] Finland ..................................... 934636
Oct. 20, 1993 [FI] Finland ..................................... 934654

[51] Int. Cl.$^7$ ...................................................... F28F 5/02
[52] U.S. Cl. ............................... 165/89; 165/90; 34/124; 492/46
[58] Field of Search ........................ 165/90, 89; 492/46; 34/124

[56] References Cited

U.S. PATENT DOCUMENTS

| | | | |
|---|---|---|---|
| 3,654,528 | 4/1972 | Barkan | 317/234 R |
| 3,738,423 | 6/1973 | Fleissner | 165/89 |
| 3,753,463 | 8/1973 | Segelken | 165/47 |
| 3,831,666 | 8/1974 | Fleissner | 165/89 |
| 3,887,250 | 6/1975 | Fleissner | 308/76 |
| 4,053,277 | 10/1977 | Bos et al. | 165/89 X |
| 4,238,700 | 12/1980 | Vinokurov et al. | 310/52 |
| 4,503,626 | 3/1985 | Rothenbacher et al. | 34/110 |
| 4,729,060 | 3/1988 | Yamamoto et al. | 361/385 |
| 4,876,780 | 10/1989 | Stahl et al. | 29/157.4 |
| 4,920,623 | 5/1990 | Neuhöffer | 29/129 |
| 4,955,433 | 9/1990 | Zaoralek | 165/89 |
| 5,370,177 | 12/1994 | Fey et al. | 165/89 |
| 5,404,936 | 4/1995 | Niskanen | 165/89 |

Primary Examiner—Christopher Atkinson
Attorney, Agent, or Firm—Cohen, Pontani, Lieberman & Pavane

[57] ABSTRACT

A thermally insulated thermoroll including a shaft supported by bearings with at least one longitudinal shaft channel defined in the shaft for passing a heating medium. A flange with radial bores is connected to the shaft and a shell, with at least one longitudinal shell channel for passing the heating medium, is connected to the flange such that the flange is interposed between the shaft and the shell. Together the shaft, flange and shell form a main body of the thermoroll. At least one first insulating wall and at least one second insulating wall are disposed in the main body of the thermoroll. The first and second insulating walls being joined at respective ends to form at least one hermetically sealed insulated cavity in the main body of the thermoroll. These insulating walls may be disposed around the shaft channel and/or the shell channel to thermally insulate the shaft and/or the shell. The insulated cavity may be hermetically sealed by electron beam welding in a vacuum chamber to form a vacuum within the interior or the insulated cavity.

27 Claims, 2 Drawing Sheets

THERMALLY INSULATED ROLL AND INSULATION ASSEMBLY FOR A THERMOROLL

CROSS-REFERENCE TO RELATED APPLICATIONS

This application is a continuation-in-part of U.S. patent application Ser. Nos. 08/326,476 and 08/326,545, both filed on Oct. 20, 1994 now abandoned.

BACKGROUND OF THE INVENTION

1. Field of the Invention

The present invention is related to a thermoroll and an insulation assembly for insulating a heating medium channel running within a shell and/or a shaft of a thermoroll against the conduction of heat. The assembly may be mounted at the end of an oil channel to provide thermal insulation of a shell end area of a thermoroll and/or mounted at the bearing point of a thermoroll shaft by means of a specially designed thermal insulation element.

2. Description of the Related Art

Paper manufacture and finishing processes employ various heatable rolls which are used to remove moisture from the web and particularly to modify the web surface qualities. The greatest mechanical load is imposed on rolls of different types of calendars as the nip pressure of modern equipment is rather high. To obtain higher throughput, which requires wider and faster calendars, the equipment must be dimensioned for extremely high loads. A particularly high stress is imposed on the bearings of heatable rolls, or thermorolls, as these bearings are subjected to the heating resulting from the conduction of heat from the shaft of the roll heated with a heating medium.

Heatable thermorolls are particularly used in softcalenders. As softcalenders are used in on-machine configurations, they must be operated at the same running speed as the paper machine itself. Such a calender has an even number of nips comprising a soft polymer-covered roll and metal-covered thermoroll. The even number of nips, and correspondingly, soft and metal-covered rolls, results from the fact that each polymer-covered roll can be run with one calender nip only, as the roll cannot take the deformations and temperature increase imposed by two nips. Hence, an even number of nips are required to achieve a symmetrical two-sided glaze finish of the web. As board is frequently calendered for higher finish on one side only, a single pair of rolls will be sufficient therein. The temperature of the soft polymer-covered roll must be monitored accurately, and even at a web break, it may not be allowed to touch the surface of the hot thermoroll.

The thermoroll is most commonly heated by hot oil, and in some cases, using other suitable heat transfer media such as water or steam. The heated oil is passed to the interior of the roll via the roll end through a longitudinal bore and then distributed to radial borings in the end flange of the roll, wherefrom the oil further passes to longitudinal borings in the shell of the roll. The circulation of the oil in the roll shell is arranged so that the oil first passes to the opposite end of the roll and then returns therefrom along a parallel boring to the same end by which it was introduced to the shell. The return oil is routed via the end flange and a second bore in the roll shaft back for heating.

The surface of the thermoroll is heated to a rather high temperature in order to impose an intense heat effect on the fast moving web during the short dwell time of the web in the nip. When oil is used for heating the roll, the surface temperature of the roll can be elevated above 200° C. Herein, the temperature of the heating oil passed into the roll may be as high as 280–300° C., which obviously results in an extremely severe heat load on the bearing. Due to the high loads imposed on the roll bearings, the roll shafts must be provided with large bearings, and in fact, the inner diameter of bearings in modern equipment is approximately 0.5 m with an outer diameter of approximately 1 m. Additional loading of the bearings is imposed by the heating caused by the heat flow from the hot oil passed via the roll shaft.

As the price of a bearing increases rapidly when a bearing of higher load rating and diameter is used, the cost impact of the bearing choice is extremely strong. Moreover, the constraints of bearing selection are dictated by the roll diameter, since the bearing and its housing must obviously fit in the space delineated by the thermoroll and the shaft of the polymer-covered roll. If the bearing load becomes so high that the computed diameter of a required size bearing would exceed the space available at the roll end, the bearing load must be reduced by using cooled bearings. This, however, makes the cost of the structure high due to required coolant circulating and cooling machinery. The coolant circulation of the bearing can be connected to the circulating oil system of the paper machine, or alternatively, the calender can be provided with a separate oil circulating system in which circulating oil of higher viscosity can be used.

The length of the thermoroll and the soft roll is slightly larger than the width of the web being finished, whereby noncontacting areas with the web remain at the ends of the rolls. As an extremely high heat flow per unit area is passed from the thermoroll to the web, while at the ends of the roll, heat can leave the roll surface only through radiative and convective losses, whereby the surface temperature of the noncontacting end areas rises higher than that of the roll surface portion making contact with the web. Such temperature difference causes several disadvantages.

The higher temperature at the ends of the roll obviously results in more extensive thermal expansion at the roll end areas. Then, the outer edge of the roll shell bulges outward from the center axis of the roll, and the bending moment caused by thermal expansion correspondingly pushes the area adjacent to the bulging area radially inward toward the center axis. This inward shrunken area coincides exactly with the web edge. Consequently, as the roll diameter at this shrunken area is smaller than at the roll middle, the caliper of the web will be thicker at the web edge than at the web middle. Hence, the cross-machine caliper profile of the web will not be even, which later causes printing problems and thus deteriorates web quality. Moreover, a thick web edge causes difficulties in winding as the wound roll will not be homogeneously tight, and narrower rolls cut from such rolls will be conical. An additional risk is imparted by the hazard of the thermoroll shell contacting the soft roll surface, whereby the polymer covering of the soft roll will be thermally destroyed.

If the thermal expansion of the roll end areas is extensive, the radially expanded end area of the roll may extend so far toward the roll middle as to reach the web edge, whereby a smaller-diameter area of the roll is formed closer to the roll middle, and thus, the web profile will become wavy. As softcalenders are used for finishing large quantities of low-weight paper grades, the web caliper may be extremely thin and even very small variations in the roll diameter and cross-machine contour profile will cause very large relative variations in the cross-machine profile of the paper web. For such reasons, any deformations in the shape of the thermoroll should be kept as smooth and small as possible.

Attempts have been made to alleviate the heating effect of the heating oil passed via the roll shaft by means of a ventilated air gap or thermal insulation. The air gap is formed by an open space about the oil ducts, and such space surrounding the oil supply and return channels of the roll is arranged to communicate with the ambient air in order to ventilate the air gap. However, while the thermal insulation capability of an air gap admittedly is good, such an arrangement has several drawbacks. The greatest problem is caused by heating oil leakage into the gap where it undergoes thermal decomposition forming oil smoke and difficult-to-remove charring which may plug the air gap. Due to the smoke formation, the air gap must be connected to a ventilation duct or exhaust fan with a discharge outside the factory hall. This arrangement may solve the problems caused by the smoke formation, but ventilation of the air gap does not reduce charring. Due to charring, the benefit offered by the air gap remains smaller than expected as the thermal insulation capability of a plugged air gap is inferior. The problem of charring is extremely difficult to overcome, because the end of the thermoroll has a complex oil channel system whose sealing to prevent any oil leakage to the air gap is extremely laborious.

Besides and instead of the air gap, a reduction of heat conduction to the noncontacting end area of a thermoroll has been attempted by means of bushings or coatings made from materials of low thermal conductivity. Coating materials employed have included zirconium oxide, and thermal insulation bushings have been made from polytetrafluoroethylene (PTFE). Obviously, thermal insulation bushings and coatings can be made from a variety of materials such as ceramics and polymer materials. The manufacture of such thermal insulation bushings and coatings is relatively easy and they can be readily adapted about the heating oil channels. However, thermal insulations made from solid materials cannot provide sufficiently good thermal insulation as can PTFE. which, for instance has a thermal conductivity that is ten times the thermal conductivity of air. Because the thermal insulation employed must tolerate a temperature as high as 300° C. under a simultaneous mechanical load, conventional thermal insulation materials cannot be used without the penalty of using an excessively complex structure for the roll shaft.

Finnish patent publication 72,580 discloses a heated roll in which hot oil is circulated in a cavity formed between a cylindrical outer shell of the roll and inner shell adapted concentrically enclosed by the outer shell. The heating medium is passed to the heating cavity via holes made in the end of the inner shell. In this roll embodiment, prevention of excessive heating of the roll end area has been attempted by means of surrounding the entire end of the inner shell with a thermally insulating ring which may be made from a solid material such as polytetrafluoroethylene or manufactured into a hollow, filled metal ring having either a sealed structure, or alternatively, provided with openings, whereby a heat transfer medium can be circulated in the ring. Such a thermal insulation assembly as that disclosed in this patent publication is suited for use only in conjunction with the roll described in the publication, and moreover, has a relatively complex structure which is difficult to manufacture.

SUMMARY OF THE INVENTION

It is an object of the present invention to achieve such a thermal insulation assembly which provides superior thermal insulation capability over the prior art and is insensitive to stresses imposed by its operating environment.

The present invention is based on adapting such a bushing-shaped thermal insulation element about the oil channels of the thermoroll shell and/or shaft that contains a gas-tight cavity.

According to one embodiment of the invention, the cavity inside the thermal insulation element is evacuated to a high vacuum.

The thermally insulated thermoroll of the present invention includes a shaft supported by bearings with at least one longitudinal shaft channel defined in the shaft for passing a heating medium. A flange with radial bores is connected to the shaft and a shell, with at least one longitudinal shell channel for passing the heating medium, is connected to the flange such that the flange is interposed between the shaft and the shell. Together the shaft, flange and shell form a main body of the thermoroll. At least one first insulating wall and at least one second insulating wall are disposed in the main body of the thermoroll. The first and second insulating walls being joined at respective ends to form at least one hermetically sealed insulated cavity in the main body of the thermoroll. These insulating walls may be disposed around the shaft channel and/or the shell channel to thermally insulate the shaft and/or the shell. The insulated cavity may be hermetically sealed by electron beam welding in a vacuum chamber to form a vacuum within the interior or the insulated cavity.

The embodiment according to the present invention achieves an extremely high thermal insulation capability. While the highest insulation capability is attained by a bushing having its insulating cavity evacuated to a vacuum, even a bushing filled with air, suitable inert gas such as nitrogen or other gas offers better insulation capability than any solid insulation material that can meet set requirements. The evacuated bushing according to the present invention can be readily fabricated using electron beam welding equipment, as the gas-tight welded bushing will inherently remain at a vacuum equal to that prevailing in the vacuum chamber of the welding equipment during welding. Correspondingly, a gas-filled bushing can be fabricated in an inert gas atmosphere using, for example, laser welding.

The material of the bushing may be the same structural steel as that used in other parts of the thermoroll, and the bushing may be designed with sufficient strength to make it less susceptible to damage during installation or use. As the bushing is hermetically sealed, its thermal insulation capability will not deteriorate during use. If the roll is made from the same material as the roll shell, the thermal expansion coefficients of all roll parts will be equal, and consequently, no stresses caused by differential thermal expansion will occur between them.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
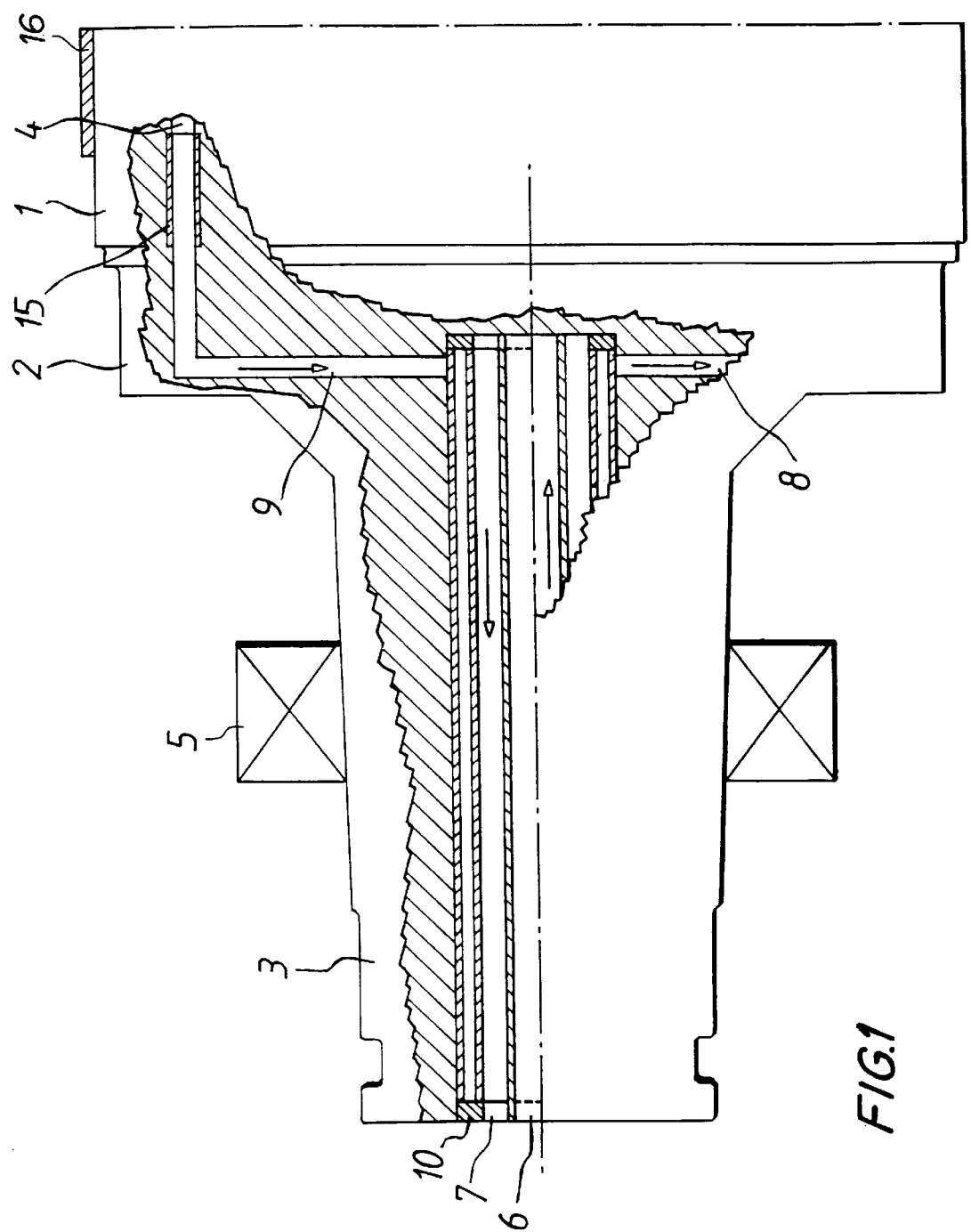
FIG. 1 is a partial longitudinal cross-sectional view of a thermally insulated roll and insulation assembly for a thermoroll in accordance with the present invention.
Figure 2:
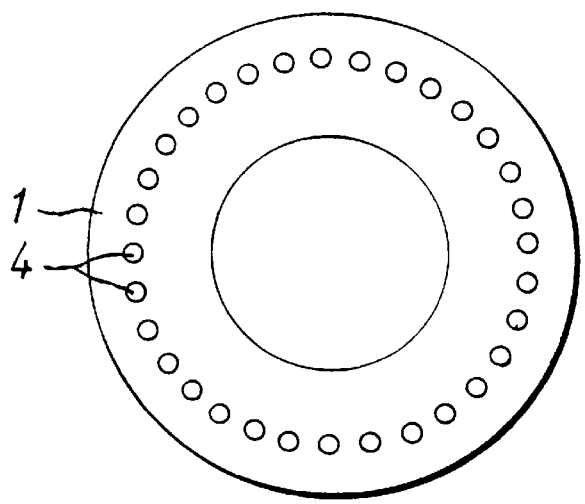
FIG. 2 is an end view of the shell of the thermoroll of FIG. 1.

FIG. 1 shows a thermally insulated thermoroll in accordance with the present invention in which the thermal insulation assembly is included in both the shaft and the shell of the thermoroll. In an alternate embodiment or construction the thermal insulation element may be used in either the shaft or the shell. The thermally insulated thermoroll shown in FIG. 1 comprises a main body or housing including a shell 1 and two end pieces 2, 3. Conventionally, the heating medium, which typically is oil, is passed into the roll and away from the roll via one end of the roll only. The structure illustrated in FIG. 1 represents such a supply end of the roll having the oil circulation means. The shell 1 of the thermoroll is a thick-walled hollow cylinder whose envelope is provided with oil channels 4. The end piece comprises an end flange 2 and a shaft 3. The roll is mounted by supporting the shafts 3 of the end pieces in bearings 5. The center of the shaft 3 is provided with a supply channel 6 for the heating oil through which the oil is passed to radial channels 8 in the end flange 2. The heating oil is passed via these radial channels to longitudinal channels 4 of the shell 1, as shown in FIG. 2, in which it passes to the opposite end of the shell 1 and is therein directed to return back via approximately parallel channels 4. At the supply end of the roll the heating oil is again collected using radially drilled channels 9 into a return channel 7 which is approximately centrally defined in the shaft so as to coaxially surround the oil supply channel 6 and passes the oil out from the end of the shaft 3 to a reheating circuit. Oil circulation in the roll can be arranged in different ways, whereby the oil forward-stream and return channels in the roll shell can be arranged so that the channels are adjacently alternating, each forward-stream channel is routed back via two return channels, or in other configurations. Similarly, the supply of the heating oil via the shaft 3 and within the end flange 2 can be implemented in various manners. As the present invention is not related to the structure of the oil supply channel system, a more detailed description of the different alternatives will be omitted herein. However, the structure of the roll used in conjunction with the present invention must be such that the heating oil or similar medium is circulated in separate channels 4 made in the shell 1 of the roll.

Figure 3:
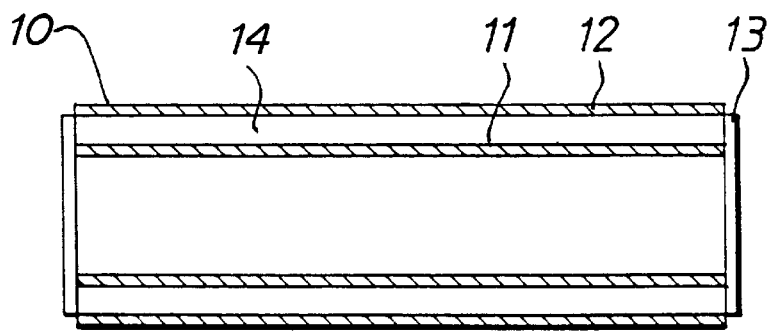
FIG. 3 is a longitudinal cross-sectional view of the thermal insulation element for the shaft of FIG. 2.

FIG. 3 depicts a cross-sectional view of the thermal assembly of the present invention for a roll shaft. A thermal insulation element 10 is adapted about the oil supply channel 6 and the return channel 7. The insulation element 10 comprises an inner cylindrical bushing 11 acting as the outer wall of the heating oil return channel 7, and an outer bushing 12 which, together with the end parts 13 of the insulation element, delineate a hermetically sealed cavity 14. The end parts 13 are joined to the ends of the bushings 11 and 12 by means of electron beam welding in a vacuum chamber. Then, the sealed cavity of the insulation element 10 will remain at a vacuum equal to that of the operating vacuum of the welding equipment vacuum chamber which typically is in the order of 10 Pa or $1 \times 10^{-4}$ bar. This vacuum is appreciated as a relatively high vacuum, which imparts a good thermal insulation capability to a space sealed to such a vacuum. The thermal insulation capability of said vacuum level is almost equal to that of evacuated flasks intended for laboratory use and is better than that of vacuum bottles intended for storage of beverages and food.

The thermal insulation element 10 extends from the end of the shaft 3 to the inner end of the radial channels 8 and 9 drilled in the end flange 2. Thus, it insulates the shaft 3 almost along its entire length from the heat of the oil passing via the oil channels, whereby heat conduction to the shaft 3 at the insulation element 10 is possible only at the end parts 13 of the element. As the end parts 13 have a small cross section, the heat flow rate via the parts remains insignificant thus imparting a good thermal insulation capability to the insulation element 10 and reducing the heat load of the bearing to a low level.

Figure 4:
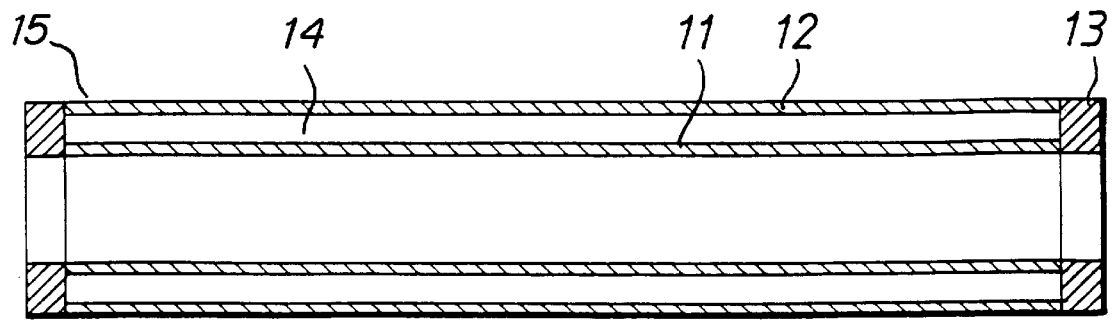
FIG. 4 is a longitudinal cross-sectional view of the thermal insulation element for the shell of FIG. 2.

FIG. 4 shows a cross-sectional view of the thermal assembly in accordance with the present invention for a roll shell 1. A thermal insulation element 15 around the oil channel 4 extends from one end of the roll shell 1 until or slightly under the edge of the web 16. The edge of the paper web 16 divides the surface of the roll shell 1 in the cross-machine direction in two parts, namely, a noncontacting end area and a contacting center area on which the web runs. The insulation element 15 comprises an inner cylindrical bushing 11 acting as the outer wall of the heating oil channel 4, and an outer bushing 12 which, together with the end parts 13 of the insulation element, delineates a hermetically sealed cavity 14. The end parts 13 are joined to the ends of the bushings 11 and 12 by means of electron beam welding in a vacuum chamber. Then, the sealed cavity of the insulation element 15 will remain at a vacuum equal to that of the operating vacuum of the welding equipment vacuum chamber which typically is in the order of 10 Pa or $1 \times 10^{-4}$ bar. This vacuum is appreciated as a relatively high vacuum, which imparts a good thermal insulation capability to a space sealed to such a vacuum. The thermal insulation capability of said vacuum level is almost equal to that of evacuated flasks intended for laboratory use and is better than that of vacuum bottles intended for storage of beverages and food.

The thermal insulation element 15 extends from the edge of the roll shell 1 toward the roll middle only slightly under the edge of the web 16. Thus, it provides moderate thermal insulation to the heat flow from the oil pipe to the noncontacting area of the shell 1, but does not impair good heat conduction from the shell 1 to the web 16. The required length of the thermal insulation element 15 and the length of its part extending under the web is dependent on the design of the roll and the amount of heat applied. Obviously, the thermal insulation elements are mounted to both ends of all channels made to the roll shell.

Besides those described above, the present invention may have alternative embodiments. The insulation element is particularly advantageously manufactured by means of electron beam welding, whereby the interior of the element remains inherently at a vacuum level of high thermal insulation capability. To make the insulation capability of the evacuated insulation element essentially better than that of a gas-filled insulation element, the vacuum inside the element should be less than 1 kPa and preferably less than 100 Pa. Due to the manufacturing advantages described above, the vacuum inside the insulation elements is obviously most readily allowed to remain equal to that of the operating vacuum of the welding equipment vacuum chamber. Yet, a relatively good thermal insulation capability is also attained by a gas-filled insulation element. Such a gas-filled element can be manufactured by means of, for example, laser welding in an inert gas atmosphere, whereby the inside of the element remains filled with the inert gas. Then, the fill gas can be an inert gas such as carbon dioxide, nitrogen or noble gas. However, the spirit of the invention is not limited to any product manufactured by a specific manufacturing method.

As the thermal insulation element is intended for use in conjunction with rotating shafts and drilled oil channels, its shape is preferably cylindrical. However, any other shape is also feasible, and in fact, a partially tapering shape for instance could be used for locking the element to the inner surface of the bored shaft or bored channel. The insulation element can be mounted to enclose the oil channels of the shaft or shell in a detachable manner. Alternatively, the insulation element can be fixed as an integral part of the shaft or oil channel by means of welding joints, for instance. The element need not necessarily extend over the entire length of the shaft end, but rather, it may provide insulation at the bearing only if so required by the roll construction.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A thermally insulated roll comprising:
   a shaft having a shaft channel defined longitudinally therein for passing a heating medium therethrough;
   a flange connected to an end of said shaft and having a bore defined therein, the bore being connected at one end thereof to the shaft channel;
   a roll shell connected to said flange so that said flange is interposed between said shaft and said roll shell, said shell having a shell channel defined longitudinally therein for passing the heating medium therethrough, the shell channel being connected to the bore of said flange;
   a first insulating wall surrounding at least a portion of a length of at least one of said shaft channel, and said shell channel proximate said flange;
   a second insulating wall surrounding said first insulating wall; and
   joining members mounted to respective ends of said first and second insulating walls so that said joining members and first and second insulating walls define a hermetically sealed insulated cavity.

2. The thermally insulated roll of claim 1, wherein said first insulating wall surrounds at least a portion of a length of said shaft channel.

3. The thermally insulated roll of claim 2, wherein the insulated cavity is shaped as a hollow cylindrical shell.

4. The thermally insulated roll of claim 2, wherein the first insulating wall comprises an outer wall of the shaft channel.

5. The thermally insulated roll of claim 2, wherein the insulated cavity has an absolute pressure of approximately less than 1 kPa.

6. The thermally insulated roll of claim 5, wherein the insulated cavity has an absolute pressure of less than 100 Pa.

7. The thermally insulated roll of claim 6, wherein the insulated cavity has an absolute pressure of approximately 10 Pa.

8. The thermally insulated roll of claim 2, and further comprising a gas in the insulated cavity.

9. The thermally insulated roll of claim 8, wherein the gas is an inert gas.

10. The thermally insulated roll of claim 1, wherein said first insulating wall surrounds at least a portion of a length of said shell channel proximate said flange.

11. The thermally insulated roll of claim 10, wherein the insulated cavity is shaped as a hollow cylindrical shell.

12. The thermally insulated roll of claim 10, wherein the first insulating wall comprises an outer wall of the shell channel.

13. The thermally insulated roll of claim 10, wherein the insulated cavity has an absolute pressure of approximately less than 1 kPa.

14. The thermally insulated roll of claim 13, wherein the insulated cavity has an absolute pressure of less than 100 Pa.

15. The thermally insulated roll of claim 14, wherein the insulated cavity has an absolute pressure of approximately 10 Pa.

16. The thermally insulated roll of claim 10, and further comprising a gas in the insulated cavity.

17. The thermally insulated roll of claim 16, wherein the gas is an inert gas.

18. The thermally insulated roll of claim 10, wherein the roll shell has a central area intended to contactingly press a web, and said first insulating wall extends along said shell channel from an edge of said roll shell connected to said flange to at least an outer edge of the central area of the roll shell but not extending across the entire central area of the roll.

19. The thermally insulated roll of claim 2, wherein said first insulating wall further surrounds at least a portion of a length of said shell channel proximate said flange.

20. The thermally insulated roll of claim 19, wherein the insulated cavity is shaped as a hollow cylindrical shell.

21. The thermally insulated roll of claim 19, wherein the first insulating wall comprises an outer wall of the shell channel.

22. The thermally insulated roll of claim 19, wherein the insulated cavity has an absolute pressure of approximately less than 1 kPa.

23. The thermally insulated roll of claim 22, wherein the insulated cavity has an absolute pressure of less than 100 Pa.

24. The thermally insulated roll of claim 23, wherein the insulated cavity has an absolute pressure of approximately 10 Pa.

25. The thermally insulated roll of claim 19, and further comprising a gas in the insulated cavity.

26. The thermally insulated roll of claim 25, wherein the gas is an inert gas.

27. The thermally insulated roll of claim 19, wherein the roll shell has a central area intended to contactingly press a web, and said first insulating wall extends along said shell channel from an edge of said roll shell connected to said flange to at least an outer edge of the central area of the roll shell but not extending across the entire central area of the roll.

* * * * *